June 23, 1953  V. H. FRAY  2,642,594
SCREW OR LIKE NICKING MACHINE
Filed Sept. 21, 1950
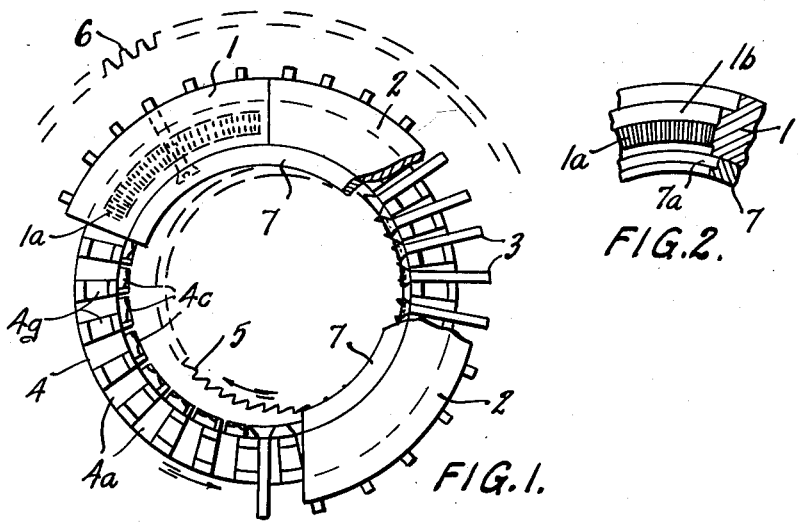
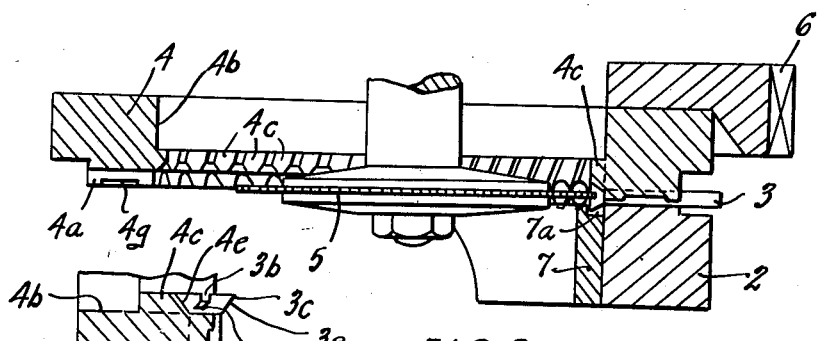
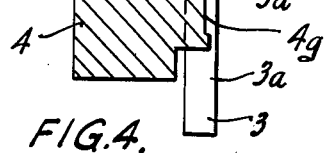
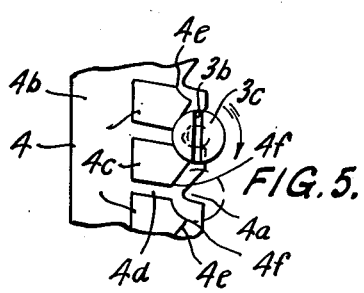
INVENTOR
Victor Hill Fray
BY Haseltine, Lake & Co.
AGENTS Patented June 23, 1953

2,642,594

UNITED STATES PATENT OFFICE 2,642,594

SCREW OR LIKE NICKING MACHINE

Victor Hill Fray, Auckland, New Zealand

Application September 21, 1950, Serial No. 186,017
In New Zealand November 29, 1949

6 Claims. (Cl. 10—6)

This invention relates to improvements in the screw nicking machine of the type as described in my U. S. A. Patent application Serial No. 72,215 of January 22, 1949, now Patent Number 2,621,343 issued December 16, 1952 and has for its objects the provision of improvements in such machine whereby, in addition to effecting the nicking of the screw blanks whereby the screwdriver slots are cut therein, provision is made for the removing of the burs which form at ends of the screwdriver slots particularly in the case of countersunk head screws.

When the screw driver slots are cut into the heads of the screw blanks by the nicking saw, a bur tends to be left at the end of the nick from which the saw has passed, there being little or no tendency in respect of round head screws, a somewhat greater tendency in respect of cheese head screws, but quite an appreciable tendency in respect of countersunk head screws because of their undercut or angular bearing faces.

Actually is it more important that the countersunk heads be free of burs than the round or cheese heads, because in the case of the countersunk heads, the bur is disposed at the bearing face of the head and is therefore objectionable as an obstruction to the true bearing of the head in the countersunk hole to which the screw will be applied when in use, the present invention having been devised to enable this bur to be economically and effectively removed, there being no known apparatus for such purpose in so far as I am aware.

While the de-burring apparatus of the present invention has been particularly devised for application to a screw nicking machine in which the de-burring is effected in the one machine immediately after the nicks or screwdriver slots have been cut in the heads of the blanks, it will be evident that while this combination has obvious advantages it could be used nevertheless for de-burring operations only, with the nicks previously cut in the blanks by any known machines for such purpose.

Broadly the invention comprises apparatus for removing burs from the angular faces of countersunk headed screw blanks comprising a rotatable carrier drum with radial slots therein for carrying the screw blanks in a circular path with the heads of such blanks facing towards the centre of the drum, means for feeding the blanks into said carrier drum and for delivering same therefrom, retaining plate means for holding the blanks in the slots of the carrier drum from feed thereinto to delivery therefrom, head retaining segment means, means on said retaining plate means for causing rotation of the blanks within the slots of the carrier drum and cutter means to the carrier drum against which the angular faces of the heads of the screw blanks bear.

In describing the invention, reference will be made to the accompanying drawings in which:

Figure 1 shows an elevation of the carrier drum, the holding and discharging segment and the retaining plate, with the latter partly broken away, Figure 2 is a partial perspective view of the face of the holding and discharging segment to show the serrations which are in portion of same, Figure 3 is an enlarged sectional plan view of the apparatus of Fig. 1, Figure 4 shows an enlarged cross section of the carrier drum with a blank carried thereby after the cutting of the nick or screwdriver slot therein, Figure 5 is a plan view of Fig. 4 and Figure 6 is a perspective view of portion of the carrier drum showing the cutters at the inner periphery thereof.

In the invention, the holding and discharging segment 1 which is essentially a continuation of the retaining plate 2 (although not integral with the latter) and which along with the retaining plate 2 presses against the shank portions 3a of the blanks 3 which are resting within the slots 4a of the rotatable carrier drum 4, is modified by the provision of serrations 1a (see Fig. 2) projecting from its smooth rubbing face 1b, the blanks 3 on being carried in their circular path of travel having passed contact with the circular metal cutting saw 5 before they reach the serrations 1a, so that they have had the nicks or slots 3b cut in their countersunk heads 3c and may have the burs 3d (see Fig. 4) extending from an end of the slots 3b.

Accordingly, in travelling the circular path through the machine, the blanks 3 are firstly held by the smooth surface of the retaining plate 2 within their carrier drum slots 4a without rotation therein and after having passed the saw 5, encounter the serrations 1a of the holding and discharging segment 1 and are caused to rotate.

Such rotation is utilised for the purpose of effecting removal of the burs 3d, cutter means being mounted on the carrier drum 4 for engaging the angular faces 3e of the countersunk heads 3c so that such burs 3d on the rotating blanks will encounter such cutter means to cause removal of said burs 3d.

Such cutter means in the preferred form are integral with the carrier drum 4, the cutter means being of ring form and disposed on the inner periphery 4b of the said carrier drum 4, there being cutters 4c in respect of each slot 4a of the carrier drum 4 with angularly disposed gaps or slots 4d (see Fig. 5) between said cutters 4c.

The cutter 4c each present angular cutter faces 4e to opposite sides thereof in the vicinity of the inner ends of the carrier drum slots 4a, these angular cutter faces 4e being complementary to the angle of the angular faces 3e of the countersunk heads 3c of the blanks 3, the said heads 3c resting in the cutter faces 4e of two adjacent cutters 4c, substantially sharp edges 4f being presented over which the heads 3c will pass when the blanks rotate.

The face of the carrier drum 4 has an annular recess 4g cut therein which substantially coincides with the serrations 1a in the segment 1, the carrier drum 4 being secured to the gear wheel 6 by which it is rotated, the apparatus including the present head retaining segment 7 with its retaining slot 7a in which the heads 3c of the blanks 3 travel and by which the blanks are prevented from moving inwardly towards the centre of the carrier drum 4.

The carrier drum apparatus as shown in the drawings is of opposite "hand" to that as shown in the drawings of the original application, the saw 5 now rotating in a clockwise direction while the carrier drum 4 rotates in an anti-clockwise direction as indicated by the arrows in Fig. 1, this reversal of arrangement having been found to be more suitable for use in conjunction with other apparatus relating to the manufacture of screws and the like.

In use or operation, the blanks 3 travel around the circular path as at present, being engaged by the smooth surface of the stationary retaining plate 2 as long as they are having the nicks 3b cut in the heads 3c thereof by the circular saw 5, but on having passed the latter and thus having moved to a position where they can be rotated, they encounter the serrated surface 1a of the holding and discharging segment 1 and as same applies pressure to the blanks (as does the retaining plate 2) they are forced to rotate within the carrier drum slots 4a because of the grip the serrations apply to the blanks.

Accordingly, the angular faces 3e of the heads 3c of the blanks 3 rotate over the cutters 4c so that any burs 3d projecting at either end of the screwdriver slot 3b get cut or sheared off and while the blanks 3 may only be carried over the serrations 1a a short distance, same will be sufficient to ensure that the blanks 3 will rotate several revolutions within the carrier drum slots 4a to effectively remove the burs 3d.

It will be understood that the holding and discharging segment 1 and the retaining plate 2 are being yieldingly forced against the shanks 3a of the blanks 3 within the carrier drum 4, as previously, and therefore because of the projecting serrations 1a, the segment 1 may move outwardly from the carrier drum 4 independently and to a greater extent than the retaining plate 2, but when the carrier drum 4 is not carrying any blanks, the face of the segment 1 and the face of the carrier drum 4 will come into contact.

Accordingly, the annular recess 4g is provided in the face of the carrier drum 4 so that said serrations 1a can pass into same without contacting the drum 4 and without being subjected to damage.

The burs 3d on being removed from the heads 3c of the blanks 3 are washed away by the usual flow of cooling and lubricating fluid down the slots 4d between the cutters 4c.

I claim:

1. In a machine for removing burrs from the angular faces of countersunk headed screw blanks, a rotatable carrier having a plurality of radial slots in one end or face adapted to receive blanks, means for rotating said carrier whereby said slots are moved in a circular path, means adapted to feed blanks into said slots adjacent to one side of said circular path, means adjacent to said face of said carrier having said radial slots therein adapted to engage the shanks of blanks in said slots and retain the same therein and rotate the shanks of blanks carried therepast by said carrier, and cutter means adjacent said path during which rotation of said shanks of blanks occurs and in cutting relation to the blanks thus rotating for removing burrs projecting therefrom.

2. In a machine for removing burrs from the angular faces of countersunk headed screw blanks, a rotatable carrier having a plurality of radial slots in one end or face adapted to receive blanks, means for rotating said carrier whereby said slots are moved in a circular path, means adapted to feed blanks into said slots adjacent to one side of said circular path, a retaining plate adjacent to said face of said carrier having said radial slots therein adapted to engage the shanks of blanks in said slots and retain the same therein, means on said retaining plate for engaging the shanks of blanks carried therepast by said carrier and rotate the same in their slots, and cutter means adjacent said path during which rotation of said shanks of blanks occurs and in cutting relation to the blanks thus rotating for removing burrs projecting therefrom.

3. In a machine for removing burrs from the angular faces of countersunk headed screw blanks, a rotatable carrier having a plurality of radial slots in one end or face adapted to receive blanks, means for rotating said carrier whereby said slots are moved in a circular path, means adapted to feed blanks into said slots adjacent to one side of said circular path, a retaining plate adjacent to said face of said carrier having said radial slots therein adapted to engage the shanks of blanks in said slots and retain the same therein, serrations on said retaining plate for engaging the shanks of blanks carried therepast by said carrier and rotate the same in their slots, and cutter means adjacent said path during which rotation of said shanks of blanks occurs and in cutting relation to the blanks thus rotating for removing burrs projecting therefrom.

4. In a screw and like slotting machine, a rotatable carrier having a plurality of radial slots in one end or face adapted to receive blanks, means for rotating said carrier whereby said slots are moved in a circular path, means adapted to feed blanks into said slots adjacent to one side of said circular path, a cutting tool rotatable within said carrier about an axis offset with respect to the axis of rotation of said carrier and adapted to cut slots in the ends of blanks carried therepast by said carrier, means adjacent to said face of said carrier having said radial slots therein adapted to engage the shanks of blanks in said slots and retain the same therein while engaged by said cutter, means adjacent to said path following that in which the slotting is effected to engage and rotate the shanks of blanks carried therepast by said carrier, and cutter means adjacent said path during which rotation of said shanks of blanks occurs and in cutting relation to the blanks thus rotating for removing burrs projecting therefrom.

5. In a screw and like slotting machine, a rotatable carrier having a plurality of radial slots in one end or face adapted to receive blanks, means for rotating said carrier whereby said slots are moved in a circular path, means adapted to feed blanks into said slots adjacent to one side of said circular path, a cutting tool rotatable within said carrier about an axis offset with respect to the axis of rotation of said carrier and adapted to cut slots in the ends of blanks carried therepast by said carrier, means adjacent to said face of said carrier having said radial slots therein adapted to engage the shanks of blanks in said slots and retain the same therein while engaged by said cutter, means adjacent to said path following that in which the slotting is effected to engage and rotate the shanks of blanks carried therepast by said carrier, and cutters connected to the carrier adjacent to each slot and in cutting relation to the blanks thus rotating for removing burrs projecting therefrom.

6. In a screw and like slotting machine, a rotatable carrier having a plurality of radial slots in one end or face adapted to receive countersunk headed blanks, means for rotating said carrier whereby said slots are moved in a circular path, means adapted to feed blanks into said slots adjacent to one side of said circular path, a cutting tool rotatable within said carrier about an axis offset with respect to the axis of rotation of said carrier and adapted to cut slots in the ends of blanks carried therepast by said carrier, means adjacent to said face of said carrier having said radial slots therein adapted to engage the shanks of blanks in said slots and retain the same therein while engaged by said cutter, a head retaining segment for preventing inward travel of the blanks, means adjacent to said path following that in which the slotting is effected to engage and rotate the shanks of blanks carried therepast by said carrier, and cutter means adjacent said path during which rotation of said shanks of blanks occurs and in cutting relation to the blanks thus rotating for removing burrs projecting therefrom.

VICTOR HILL FRAY.

FOREIGN PATENTS

| Number | Country | Date |
|---|---|---|
| 379,262 | Germany | Aug. 20, 1923 |
| 591,245 | Germany | Jan. 18, 1934 |
| 597,253 | Germany | May 19, 1934 |